United States Patent
McCure

(10) Patent No.: US 9,909,702 B2
(45) Date of Patent: Mar. 6, 2018

(54) QUICK CONNECT SYSTEM FOR AUTOMOTIVE FLUID TRANSPORT LINES

(71) Applicant: FORD GLOBAL TECHNOLOGIES, LLC, Dearborn, MI (US)

(72) Inventor: Randall P. McCure, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 386 days.

(21) Appl. No.: 14/735,381

(22) Filed: Jun. 10, 2015

(65) Prior Publication Data

US 2016/0363247 A1    Dec. 15, 2016

(51) Int. Cl.
| | |
|---|---|
| *F16L 21/06* | (2006.01) |
| *F16L 33/207* | (2006.01) |
| *F16L 37/12* | (2006.01) |
| *F16L 21/08* | (2006.01) |
| *F16L 25/06* | (2006.01) |
| *F16L 37/098* | (2006.01) |
| *F16L 33/03* | (2006.01) |

(52) U.S. Cl.
CPC .............. *F16L 37/12* (2013.01); *F16L 21/06* (2013.01); *F16L 21/08* (2013.01); *F16L 25/06* (2013.01); *F16L 37/0985* (2013.01); *F16L 33/03* (2013.01); *F16L 33/2071* (2013.01); *F16L 33/2075* (2013.01); *F16L 2201/10* (2013.01)

(58) Field of Classification Search
CPC ......... F16L 21/02; F16L 21/035; F16L 21/04; F16L 21/06; F16L 21/08; F16L 33/2071; F16L 33/2073; F16L 33/2075; F16L 33/28
See application file for complete search history.

(56) References Cited

U.S. PATENT DOCUMENTS

| | | | |
|---|---|---|---|
| 4,786,085 A | 11/1988 | Sauer et al. | |
| 4,991,882 A | 2/1991 | Gähwiler | |
| 5,074,600 A * | 12/1991 | Weinhold | F16L 33/12 |
| | | | 285/148.13 |
| 6,893,055 B2 | 5/2005 | Thomas et al. | |
| 6,908,114 B2 | 6/2005 | Moner | |
| 7,390,028 B2 | 6/2008 | Blazek | |

(Continued)

FOREIGN PATENT DOCUMENTS

| | | | |
|---|---|---|---|
| CN | 202252499 U | 5/2012 | |
| DE | 102015210005 A1 * | 12/2015 | .......... F16L 33/2071 |

(Continued)

*Primary Examiner* — Frederick L Lagman
(74) *Attorney, Agent, or Firm* — James Dottavio; MacMillan, Sobanski & Todd, LLC

(57) ABSTRACT

A quick connect system for joining two fluid lines has a receiver with a first end mounted to a first line, a center section to receive a tip of a second line, and a second end defining a cylindrical sleeve spaced from the second line. A snap retainer comprises a plurality of molded stave members and a tension band. Each stave member extends longitudinally from a collar section to a clip section. The stave members are arranged cylindrically to define a socket to receive the cylindrical sleeve. The tension band is secured over the collar sections to retain the stave members on the second line with the clip sections cantilevered over the tip. The clip sections each includes a hook that snaps over an external lug on the receiver so that a resilient seal is compressed between the cylindrical sleeve and the tip of the second fluid line.

20 Claims, 6 Drawing Sheets

(56) References Cited

U.S. PATENT DOCUMENTS

| | | | | |
|---|---|---|---|---|
| 2009/0179422 A1* | 7/2009 | Werth | ............... | F16L 33/2071 |
| | | | | 285/243 |
| 2010/0013215 A1* | 1/2010 | Werth | ............... | F16L 33/2071 |
| | | | | 285/243 |
| 2010/0287740 A1* | 11/2010 | Rigollet | ............... | F16L 33/03 |
| | | | | 24/270 |
| 2011/0067225 A1* | 3/2011 | Bassaco | ............... | F16D 25/08 |
| | | | | 29/525.01 |
| 2014/0209074 A1* | 7/2014 | Kahle | ............... | F16L 37/088 |
| | | | | 123/572 |
| 2014/0300101 A1* | 10/2014 | Bobenhausen | ...... | F16L 33/2071 |
| | | | | 285/242 |
| 2015/0219262 A1* | 8/2015 | Schuessler | ............ | F16L 41/08 |
| | | | | 285/317 |

FOREIGN PATENT DOCUMENTS

| | | | | |
|---|---|---|---|---|
| EP | 0621432 A1 * | 10/1994 | .......... | F16L 33/2071 |
| EP | 3090834 A1 * | 11/2016 | ........... | B25B 25/005 |
| FR | 2867829 A1 * | 9/2005 | .............. | F16L 21/06 |

\* cited by examiner

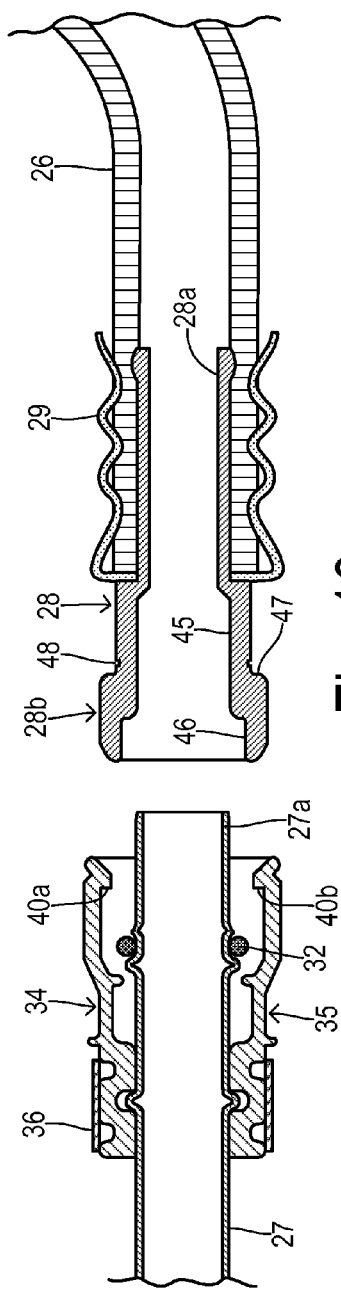
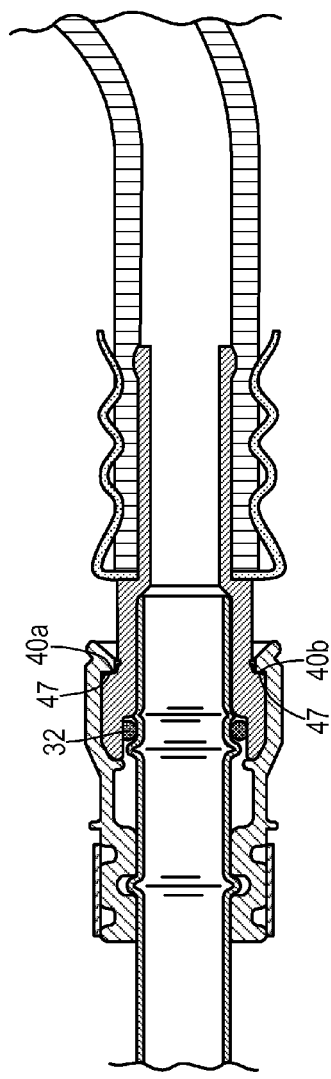
Fig. 10
Fig. 11

QUICK CONNECT SYSTEM FOR AUTOMOTIVE FLUID TRANSPORT LINES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to fluid line couplings, and, more specifically, to quick-connect tubular couplings for automotive fluid systems such as a transmission oil cooler.

Many different types of fluid handling systems may utilize a quick connect system wherein two fluid lines are selectably joined by a make-or-break coupling. Especially in a high-volume manufacturing application (e.g., automotive assembly lines), a snap-together coupling which can be completed without the need for tools or extra components or fasteners is desired. The quick connect must be removable to allow replacement or servicing of a fluid line or fluid handling component (which may require a tool).

Automotive fluid systems using a quick connect may include a transmission oil cooler, an air conditioning refrigerant circuit, fuel delivery circuit, and others. The fluid lines may include tubes formed of metal, rubber, or other synthetics. A common location for a quick connect would be between a metal tube extending from a heat exchanger and a flexible hose for transporting a fluid to/from a target device. Since the fluid system may carry volatile liquids, the quick connect system must satisfy strict performance requirements such as making a strong, tough, and durable seal in a device that has long life, is impact resistant and chemical resistant, and able to tolerate extreme heat and cold, while being easy to assemble and disassemble. The size must be compact in order to preserve packaging volume within a particular vehicle.

It is particularly important during vehicle assembly operations that complete engagement of the lines is achieved 100% of the time. In the automotive industry, for example, oil lines are designated as "inverted delta" items wherein extremely high reliability is required. When two such oil transport lines are coupled on the assembly line, it is highly desirable for proper completion of the connection to be easily confirmed by the installer. A perceptible feedback (e.g., tactile, visual, or audible) can be designed into a connector so that the installer can immediately verify completion of the coupling operation. However, prior feedback features for quick connects have relied on internal snaps that can be difficult to perceive in a noisy, vibration-filled environment of an assembly line.

SUMMARY OF THE INVENTION

The invention provides a robust, plastic-molded snap feature which wraps 360° around the exterior of the quick connect joint. A high-strength type of "engineering plastic" is used which has the needed properties of strength, toughness, and temperature tolerance. The exterior snap feature is easily observable, as opposed to an internal snap feature which is difficult to observe. The invention is configured in such a way that a visual cue or "red flag" remains visible if the joint is not 100% completed. In such a case, the solution is to continue to push the joint together until the snap engages. In a high volume production line environment, a high reliability can be achieved using only simple human observation, as opposed to using complex electronic sensing devices.

The invention is "designed for manufacturing" wherein the subcomponents are relatively easy to manufacture and assemble. The quick connect achieves high reliability while being less costly than other presently available solutions.

In one aspect of the invention, a quick connect for first and second fluid lines comprises a receiver having a first end adapted to mount to a tip of the first fluid line, a center section adapted to receive a tip of the second fluid line, and a second end defining a cylindrical sleeve adapted to be spaced from the tip of the second fluid line. A resilient seal is arranged between the cylindrical sleeve and the tip of the second fluid line. A snap retainer comprises a plurality of molded stave members and a tension band. Each stave member extends longitudinally from a collar section to a clip section, and the stave members are arranged cylindrically to define a socket adapted to receive the cylindrical sleeve of the receiver. The tension band is secured over the collar sections to retain the stave members on the tip of the second fluid line with the clip sections cantilevered over the tip of the second fluid line. The clip sections each includes a hook that snaps over an external lug on the receiver to complete a connection between the fluid lines so that the resilient seal is compressed between the cylindrical sleeve and the tip of the second fluid line.

BRIEF DESCRIPTION OF THE DRAWINGS

FIGS. 10 and 11 are cross-sectional views of a quick connect of the present invention before and after assembly, respectively.

DETAILED DESCRIPTION OF PREFERRED EMBODIMENTS

Figure 1:
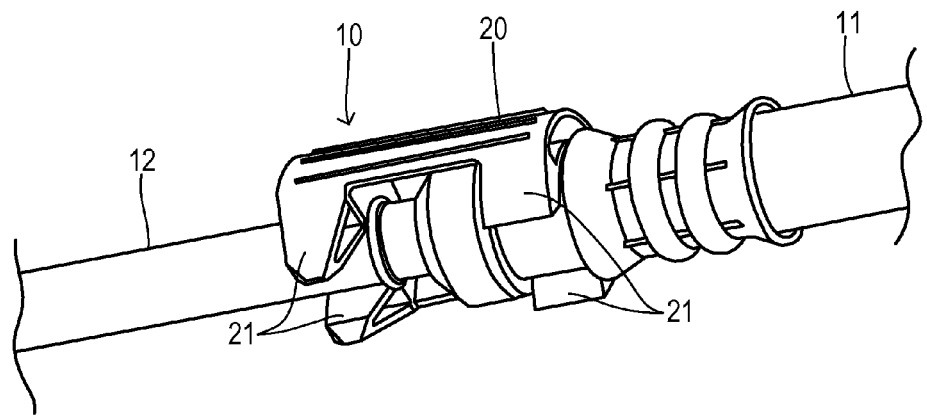
FIG. 1 is a perspective view of a prior art quick connect with an outer clip.
Figure 2:
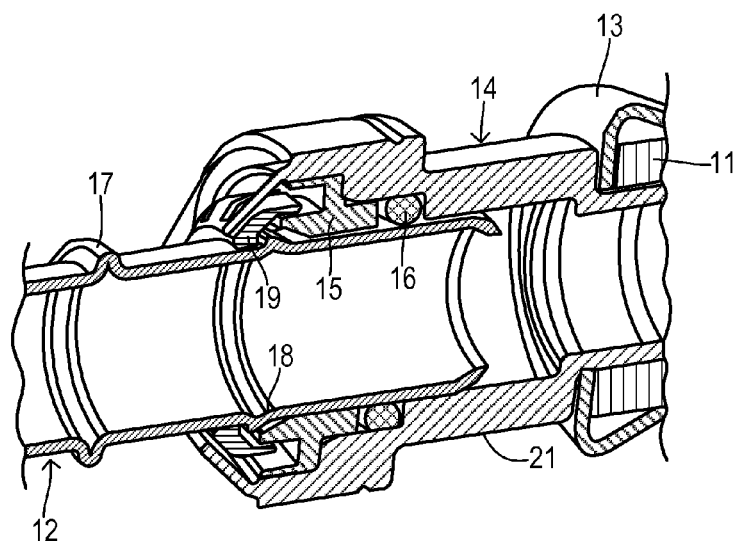
FIG. 2 is a cross section of the quick connect of FIG. 1 without the outer clip.

Referring to FIGS. 1 and 2, a quick connect system 10 interconnects fluid lines 11 and 12. A ferrule 13 helps retain a receiver 14 in a sealed manner within fluid line 11. A plastic insert 15 fits into the end of receiver 14 in order to capture an O-ring seal 16 in a resulting groove. Fluid line 12 is shown as a metal tube having crimp ridges 17 and 18. Plastic insert 15 has an annular snap ring portion 19 that snaps over ridge 18 when line 12 is inserted sufficiently far into receiver 14 that O-ring seal 16 becomes compressed around an outer surface of fluid line 12. A clip 20 has fingers 21 for engaging crimp ridge 17 of line 12 and a groove 21 on receiver 14 to insure a complete and robust coupling of the quick connect. However, the internal snap action may be hard to perceive and the plastic snap components are relatively complex to mold. Furthermore, the use of a separate clip results in added cost and increased difficulty to manufacture.

Figure 3:
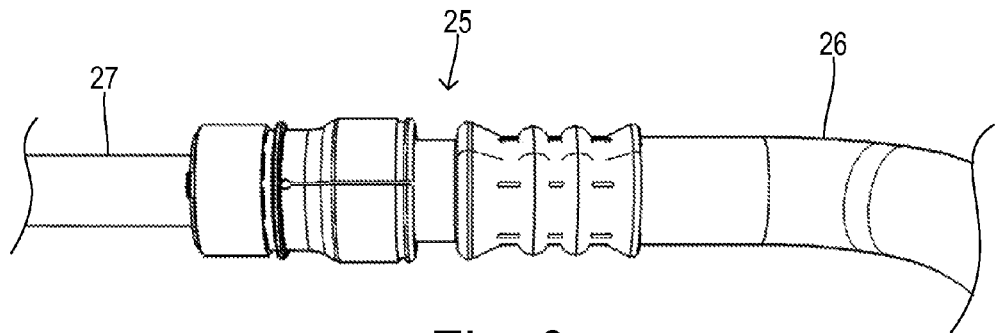
FIG. 3 is a side view of an assembled quick connect according to one embodiment of the invention.

FIG. 3 shows a quick connect system 25 of the present invention for an automotive fluid system such as a transmission oil transport circuit for cooling of the transmission oil. A first fluid line 26 may be a rubber hose for transmitting fluid (e.g., oil) to a remote component, and second fluid line 27 may be a metal tube extending from a fluid system component (e.g., a heat exchanger). Quick connect 25 includes respective elements for mounting to respective tips of lines 26 and 27 for selectively connecting and disconnecting the fluid transport circuit.

Figure 4:
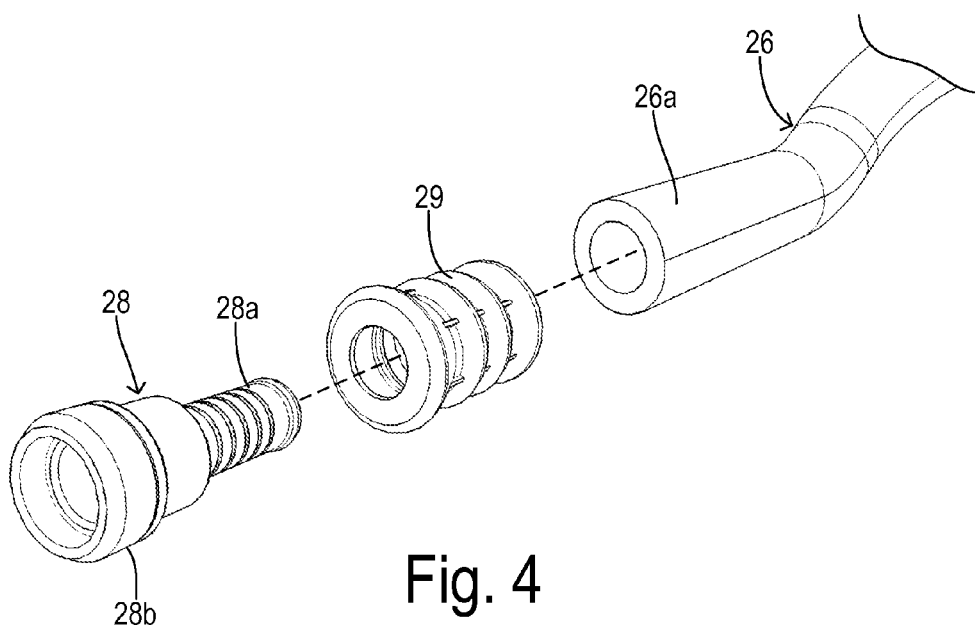
FIG. 4 is an exploded view of one fluid line with its associated receiver and ferrule for the embodiment of FIG. 3.
Figure 5:
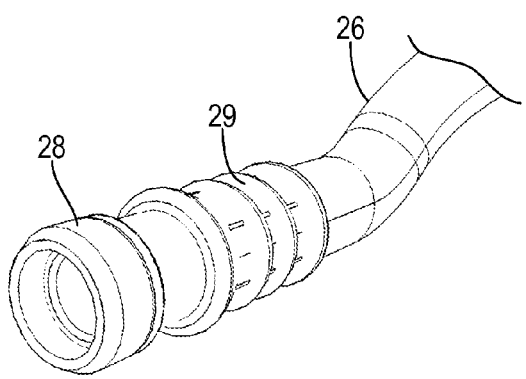
FIG. 5 shows the receiver and ferrule installed on the fluid line of FIG. 4.
Figure 6:
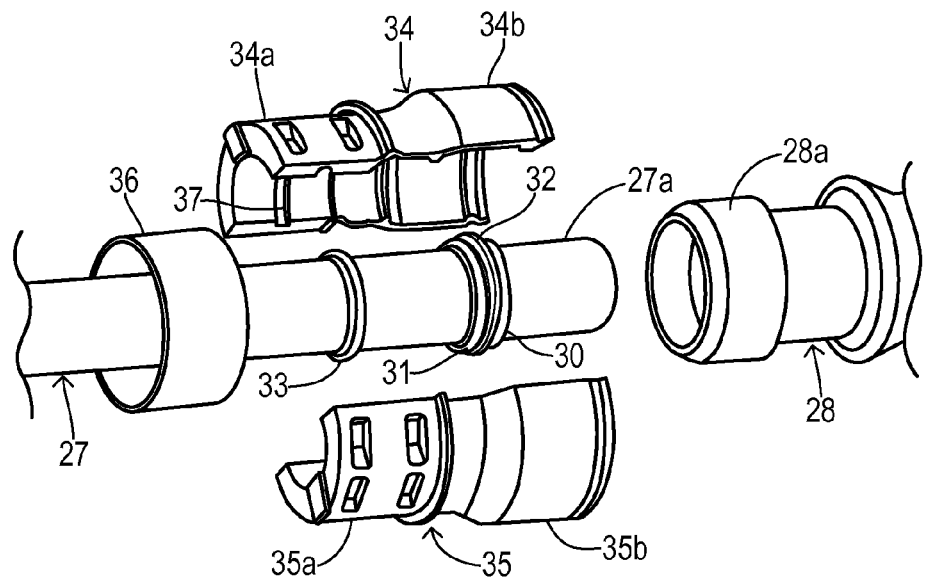
FIG. 6 is an exploded view of a second fluid line with its associated snap retainer and O-ring seal for the embodiment of FIG. 3.

As shown in FIGS. 4 and 5, first fluid line 26 has a tip 26a for receiving a first end 28a of a receiver 28. Receiver 28 may preferably be comprised of machined or cast aluminum, and first end 28a may include ribs to help obtain a seal when end 28a is inserted inside tip 26a. A second end 28b of receiver 28 forms a cylindrical sleeve for interfacing with the other fluid line and creating a snap connection with other quick connect components as described below. A ferrule 29 covers tip 26a and receiver end 28a to provide compression that retains receiver 28 in place. Ferrule 29 may be installed by crimping, for example.

Figure 7:
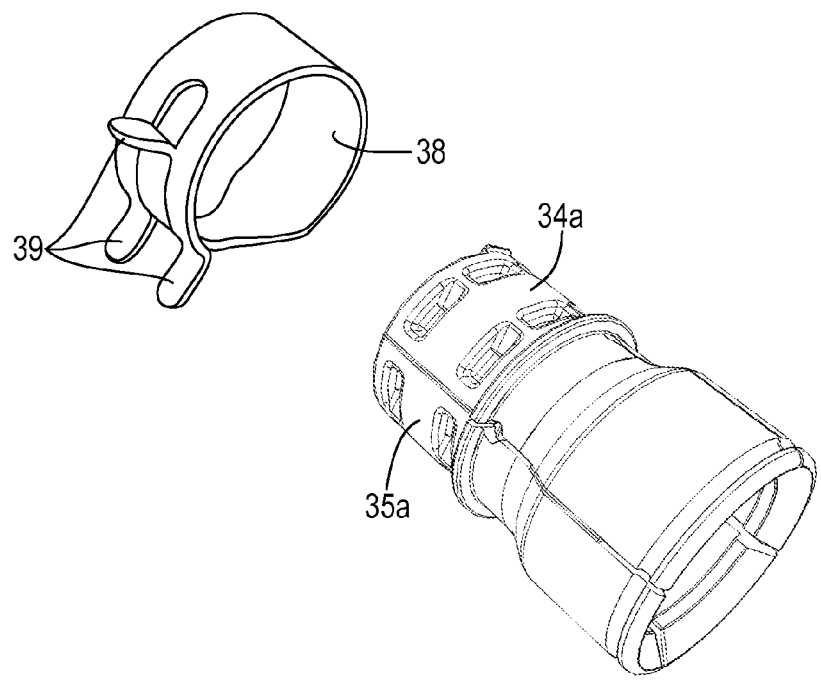
FIG. 7 is an exploded perspective view of a snap retainer wherein the tension band is comprised of a spring clip.

Fluid line 27 has a tip 27a for receiving the other quick connect components. Tip 27a is a metal tube commonly referred to as an end form. The end form includes crimped ridges 30 and 31 for defining a groove to receive an O-ring seal 32. The end form further includes a crimped ridge 33. In order to form a socket for receiving cylindrical sleeve 28a of receiver 28, a snap retainer is mounted to the end form comprising molded stave members 34 and 35 that extend longitudinally from respective collar sections 34a and 35a to respective clip sections 34b and 35b. Stave members 34 and 35 are arranged cylindrically over tip 27a to define the socket as an annular space adapted to receive cylindrical sleeve 28a. A tension band 36 is secured over collar sections 34a and 35a to retain stave members 34 and 35 on tip 27a. Clip sections 34b and 35b are cantilevered over tip 27a to define the socket. Collar sections 34a and 35a further define an annular groove 37 for receiving ridge 33 for proper alignment and retention of stave members 34 and 35 on end-form tip 27a. Tension band 36 may be comprised of a crimped metal band or an elastomeric band to compress collar sections 34a and 35a onto tip 27a. As shown in FIG. 7, tension band 36 may alternatively be comprised of a spring clip having an inner surface 38 defining an inner diameter slightly less than an outer diameter of collar sections 34a and 35a, and having tabs 39 that can be manipulated to enlarge the inner diameter to facilitate installation over collar sections 34a and 35a.

Figure 8:
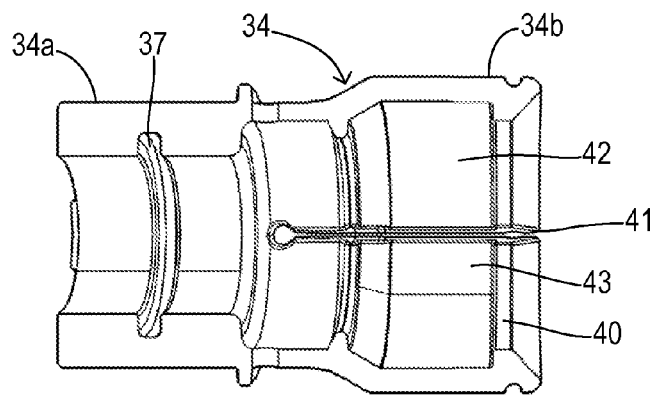
FIGS. 8 and 9 are an interior plan view and a perspective view of one preferred embodiment of a stave member.
Figure 9:
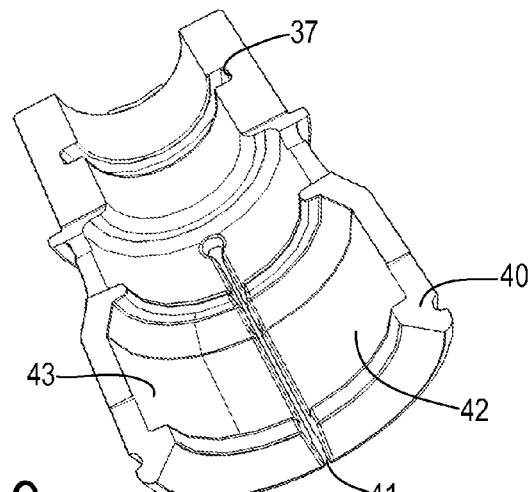

Referring to FIGS. 8 and 9, a stave member 34 includes a hook 40 adapted to provide a snap fit by engaging with an external lug on the receiver. In the preferred embodiment, stave members 34 and 35 are comprised of two semicylindrical plastic shells. Preferably, the stave members may be comprised of identical molded plastic elements to reduce the number of unique components to be molded. More than two stave members can be used, such as with three separate stave members each spanning 120°. A longitudinal slot 41 may bisect clip section 35b in order to form multiple clip fingers 42 and 43 for providing additional flexibility allowing additional bending for increasing deflection of hook 40, if needed, when assembling over the cylindrical sleeve of the receiver as described below.

As seen in cross-section in FIG. 10, tubular first end 28a of receiver 28 is sized to fit within the inside diameter of fluid line 26. Cylindrical sleeve end 28b has a center section 45 with an inside diameter adapted to receive the outside diameter of tip 27a of fluid line 27. Center section 45 aligns tip 27a with receiver 28 and provides for a stable interconnect. An outer section 46 of sleeve 28b has a larger inside diameter adapted to provide a seating surface for compressing O-ring 32 to obtain a good seal between receiver 28 and fluid line 27. An outer annular surface of cylindrical sleeve 28b defines an external lug 47 for receiving hook 40 of each respective stave member. External lug 47 may preferably be comprised of a radial step as shown. One continuous annular lug may extend over the full periphery, or separate lugs can be provided for each respective hook. An annular groove 48 may be spaced from lug 47 to provide a clear demarcation boundary corresponding to full engagement of hook 40 as described below.

Figure 12:
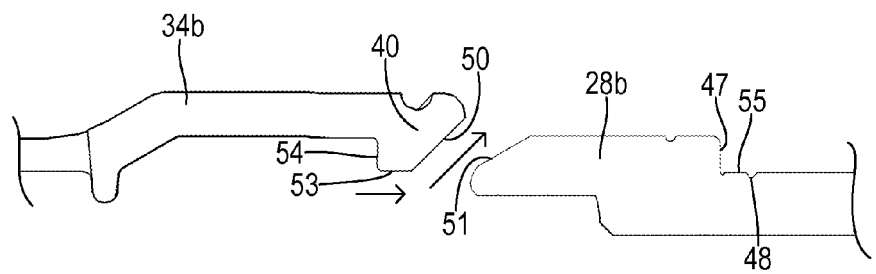
FIG. 12 is a close-up showing ramp surfaces on a stave member and a cylindrical sleeve to facilitate the snap connection.

FIG. 11 shows the installed state of the quick connect wherein resilient O-ring seal 32 is compressed between cylindrical sleeve surface 46 and tip 27a. The quick connect is retained in a closed state by the retention of hooks 40a and 40b against external lug 47. As shown in greater detail in FIG. 12, hook 40 includes a ramp surface 50 and cylindrical sleeve 28b includes a ramp surface 51 to create a deflection force that deflects clip section 34b during insertion of cylindrical sleeve 28b into the socket formed between tip 27a and the clip sections. When hook 40 snaps into place over lug 47, a nose surface 53 of hook 40 bears against a ring surface 55 and a radial surface 54 bears against lug 47. Ring surface 55 is preferably provided with a distinctive color (e.g., painted with a red paint) in order to provide visual feedback indicating the status of the connection. The visual feedback is a supplement to the tactile and audible feedback obtained from the snapping action when hook 40 clears lug 47 and returns to an undeflected position. Annular groove 48 helps constrain the application of paint or other marking substance within the intended ring surface.

Figure 13:
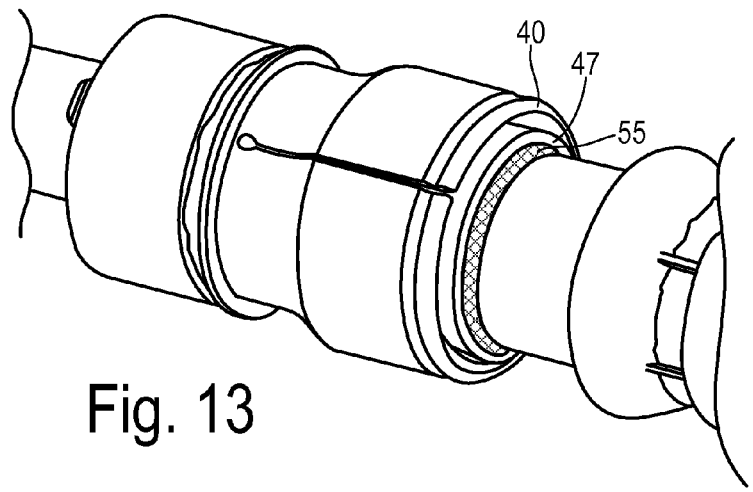
FIG. 13 is a perspective view of a quick connect of the invention wherein full insertion has not been completed.
Figure 14:
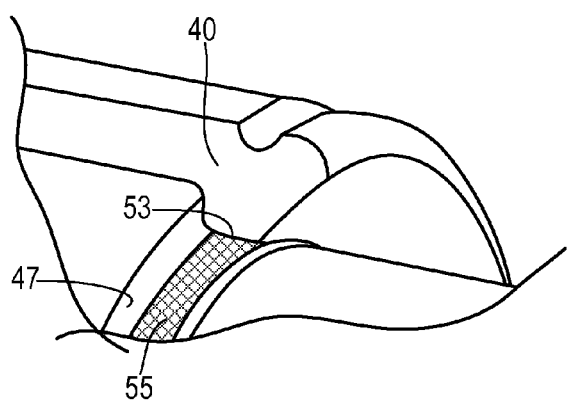
FIG. 14 is a close-up view showing a fully completed snap connection.

FIG. 13 shows a partially connected state of the quick connect wherein hook 40 has not snapped over lug 47 so that annular ring surface 55 remains visible (i.e., not concealed by clip hook 40). FIG. 14 shows a partially broken away view wherein nose 53 of hook 40 conceals ring surface 55 after hook 40 has been snapped completely over lug 47.

Figure 15:
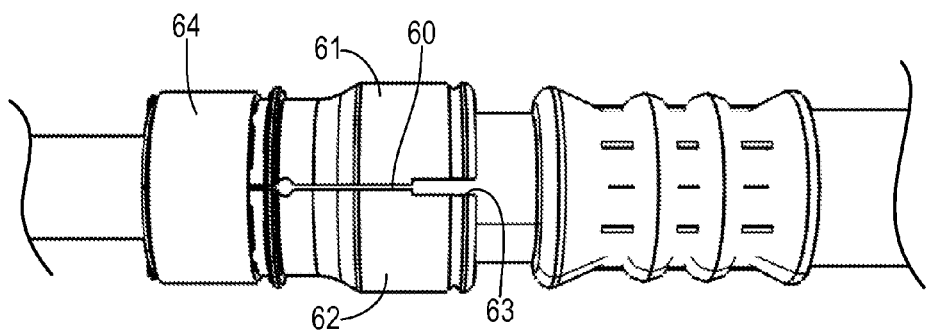
FIG. 15 is a side view showing an enlarged slot end between adjacent stave members to facilitate disassembly of the quick connect.

In order to disassemble a fully completed connection, a special tool can be provided in order to flex the clip fingers outward sufficiently to clear the latching surface between the hook(s) and lug. Alternatively, the tension band compressing the collar sections can be made flexible or otherwise removable in order to release the cantilevered clip sections from the cylindrical sleeve. In order to assist removal and to avoid the need for any unique tools, a slot feature as shown in FIG. 15 can be utilized. A slot 60 between adjacent stave members 61 and 62 includes a molded-in notch 63 having a width adapted to receive the blade of a screwdriver for prying apart (i.e., deflecting) adjacent hooks to release the corresponding lug. Preferably, tension band 64 may be an elastic member (e.g., comprised of rubber) to allow pivoting of the stave members to assist in the removal.

What is claimed is:

1. A quick connect for first and second fluid lines, comprising:
   a receiver having a first end adapted to mount to a tip of the first fluid line, a center section adapted to receive a tip of the second fluid line, and a second end defining a cylindrical sleeve adapted to be spaced from the tip of the second fluid line;
   a resilient seal; and
   a snap retainer comprising:
      a plurality of molded stave members each extending longitudinally from a collar section to a clip section, wherein the stave members are arranged cylindrically to define a socket adapted to receive the cylindrical sleeve of the receiver; and
      a tension band secured over the collar sections to retain the stave members on the tip of the second fluid line with the clip sections cantilevered over the tip of the second fluid line;
   wherein the clip sections each includes a hook that snaps over an external lug on the receiver to complete a connection between the fluid lines wherein the resilient seal is compressed between the cylindrical sleeve and the tip of the second fluid line.

2. The quick connect of claim 1 wherein the external lug is comprised of an radial step on the cylindrical sleeve.

3. The quick connect of claim 1 wherein the stave members are comprised of identical molded plastic elements.

4. The quick connect of claim 1 wherein the stave members are comprised of two semi-cylindrical plastic shells.

5. The quick connect of claim 1 wherein the clip section of each stave member includes multiple clip fingers extending longitudinally.

6. The quick connect of claim 1 wherein the resilient seal is comprised of an elastomeric O-ring retained in an annular groove on the second fluid line.

7. The quick connect of claim 1 wherein the tension band is comprised of a spring clip.

8. The quick connect of claim 1 wherein, after being snapped over the lug, then the hooks on the clip sections conceal a ring surface on the receiver adjacent the lug, and wherein the ring surface has a distinctive color.

9. The quick connect of claim 1 wherein the second line is comprised of a metal end-form tube.

10. The quick connect of claim 9 wherein the tube has a crimp ridge, and wherein the collar sections include an inner channel receiving the crimp ridge.

11. The quick connect of claim 9 wherein the tube has a pair of crimped ridges defining an annular groove to receive the annular seal.

12. The quick connect of claim 1 wherein the clip sections and cylindrical sleeve define mating ramp surfaces to deflect the clip sections during insertion of the cylindrical sleeve into the socket.

13. The quick connect of claim 1 wherein adjacent stave members define a notch between the adjacent clip sections for prying the adjacent hooks over the lug.

14. The quick connect of claim 1 wherein the first fluid line is comprised of a flexible hose, wherein the first end of the receiver is inserted into the tip of the first fluid line, and wherein the quick connect further comprises a ferrule mounted over the tip of the first fluid line to compress the tip against the first end of the receiver.

15. An automotive fluid system comprising:
   a first fluid line conveying the automotive fluid and having a tip;
   a second fluid line conveying the automotive fluid and having a metal end-form tube; and
   a quick connect joining the first and second fluid lines comprising:
      a receiver having a first end adapted to mount to the tip, a center section adapted to receive the end-form tube, and a second end defining a cylindrical sleeve adapted to be spaced from the end-form tube;
      a resilient seal; and
      a snap retainer comprising A) a plurality of molded stave members each extending longitudinally from a collar section to a clip section, wherein the stave members are arranged cylindrically around the metal end-form tube to define a socket adapted to receive the cylindrical sleeve of the receiver, and B) a tension band secured over the collar sections to retain the stave members on the tip of the second fluid line with the clip sections cantilevered over the tip of the second fluid line;
      wherein the clip sections each includes a hook that snaps over an external lug on the receiver to complete a connection between the fluid lines wherein the resilient seal is compressed between the cylindrical sleeve and the tip of the second fluid line.

16. The automotive fluid system of claim 15 wherein the end-form tube has a crimp ridge, and wherein the collar sections include an inner channel receiving the crimp ridge.

17. The automotive fluid system of claim 15 wherein the end-form tube has a pair of crimped ridges defining an annular groove to receive the annular seal, and wherein the resilient seal is comprised of an elastomeric O-ring.

18. The automotive fluid system of claim 15 wherein, after being snapped over the lug, then the hooks on the clip sections conceal a ring surface on the receiver adjacent the lug, and wherein the ring surface has a distinctive color.

19. The automotive fluid system of claim 15 wherein the clip sections and cylindrical sleeve define mating ramp surfaces to deflect the clip sections during insertion of the cylindrical sleeve into the socket.

20. A quick connect, comprising:
   a receiver mounted to a first fluid line having a cylindrical sleeve spaced from a second fluid line;
   a seal compressed between the second line and sleeve; and
   a snap retainer with molded stave members cantilevered over the second line by a tension band;
   wherein the stave members include hooks that snap over an external receiver lug connecting the fluid lines and simultaneously fully covering a distinctively colored receiver ring surface.

* * * * *